United States Patent
Tsuda

(10) Patent No.: US 11,273,847 B2
(45) Date of Patent: Mar. 15, 2022

(54) AUTONOMOUS DRIVING SUPPORT APPARATUS AND AUTONOMOUS DRIVING SUPPORT METHOD

(71) Applicant: Mitsubishi Electric Corporation, Chiyoda-ku (JP)

(72) Inventor: Yoshiaki Tsuda, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 241 days.

(21) Appl. No.: 16/342,279

(22) PCT Filed: Oct. 20, 2017

(86) PCT No.: PCT/JP2017/038002
§ 371 (c)(1),
(2) Date: Apr. 16, 2019

(87) PCT Pub. No.: WO2018/074586
PCT Pub. Date: Apr. 26, 2018

(65) Prior Publication Data
US 2019/0322291 A1    Oct. 24, 2019

(30) Foreign Application Priority Data
Oct. 21, 2016   (JP) .............................. JP2016-206897

(51) Int. Cl.
*B60W 50/14* (2020.01)
*G05D 1/00* (2006.01)
*G05D 1/02* (2020.01)

(52) U.S. Cl.
CPC ........... *B60W 50/14* (2013.01); *G05D 1/0088* (2013.01); *G05D 1/0276* (2013.01); *B60W 2050/146* (2013.01); *B60W 2540/043* (2020.02)

(58) Field of Classification Search
CPC .......... B60W 50/14; B60W 2540/043; B60W 2540/045
See application file for complete search history.

(56) References Cited

U.S. PATENT DOCUMENTS 10,663,965 B2 *   5/2020   Yako ................... G06K 9/00845
10,723,359 B2 *   7/2020   Thompson ............ B60W 60/00
(Continued)

FOREIGN PATENT DOCUMENTS

CN           1645055 A       7/2005
DE   10 2007 030 839 A1     1/2009
(Continued)

OTHER PUBLICATIONS

International Search Report dated Jan. 23, 2018 in PCT/JP2017/038002, 2 pages.

(Continued)

*Primary Examiner* — Peter D Nolan
*Assistant Examiner* — Mikko Okechukwu Obioha
(74) *Attorney, Agent, or Firm* — Oblon, McClelland, Maier & Neustadt, L.L.P.

(57) ABSTRACT

An autonomous driving support apparatus (100) is mounted on an autonomous vehicle (10) to perform autonomous driving using dynamic map data. A dynamic map storage unit (141) stores the dynamic map data. A use condition storage unit (142) stores use condition information in which a use condition of the dynamic map data is set. A determination unit (120) determines whether or not the autonomous driving by the autonomous vehicle (10) is possible, based on the dynamic map data stored in the dynamic map storage unit (141) and the use condition information stored in the use condition storage unit (142).

16 Claims, 11 Drawing Sheets

(56) References Cited

U.S. PATENT DOCUMENTS

| | | | |
|---|---|---|---|
| 10,915,965 B1* | 2/2021 | Fields | G05D 1/0214 |
| 2005/0159885 A1 | 7/2005 | Nomura | |
| 2014/0156133 A1* | 6/2014 | Cullinane | B60W 50/082 |
| | | | 701/23 |
| 2014/0156134 A1* | 6/2014 | Cullinane | G05D 1/0223 |
| | | | 701/23 |
| 2015/0217763 A1* | 8/2015 | Reichel | B60W 50/08 |
| | | | 701/23 |
| 2015/0353088 A1 | 12/2015 | Ishikawa | |
| 2016/0347327 A1* | 12/2016 | Kondo | B60W 50/082 |
| 2018/0046185 A1* | 2/2018 | Sato | B60W 50/14 |
| 2018/0059663 A1* | 3/2018 | Yako | G06K 9/00845 |
| 2018/0088577 A1* | 3/2018 | Kim | H04M 1/72463 |
| 2018/0113460 A1 | 4/2018 | Koda et al. | |
| 2018/0120844 A1* | 5/2018 | Okamoto | B60W 30/14 |
| 2021/0021587 A1* | 1/2021 | Miu | H04L 9/3231 |

FOREIGN PATENT DOCUMENTS

| | | |
|---|---|---|
| DE | 20 2015 104 711 U1 | 11/2015 |
| EP | 3 276 586 A1 | 1/2018 |
| JP | 2001-195332 A | 7/2001 |
| JP | 2005-233930 A | 9/2005 |
| JP | 2006-171914 A | 6/2006 |
| JP | 2007-108917 A | 4/2007 |
| JP | 2015-175825 A | 10/2015 |
| JP | 2015-230573 A | 12/2015 |
| JP | 2016-181031 A | 10/2016 |
| WO | WO 2016/152873 A1 | 9/2016 |

OTHER PUBLICATIONS

"Services Using Three-dimensional Position Information and Development of Common Platform", Council on Competitiveness-Nippon, 2014 Year Project, Final Report, (with partial unedited computer generated English translations of front page pp. 15-16, 21,27, and 36) pp. 1-45 with cover pages.

"Modelling of Traffic Situation/Dynamic Map", Nissan Motor Co., Ltd., Jan. 29, 2015, SIP-adus (with partial unedited computer generated English translations) pp. 1-9 with cover page.

Extended European Search Report dated Oct. 18, 2019 in European Patent Application No. 17862522.4, 8 pages.

Office Action dated Jan. 7, 2020 in corresponding Japanese Patent Application No. 2018-545769 (with English Translation), 9 pages.

Combined Chinese Office Action and Search Report dated Feb. 19, 2021 in Chinese Patent Application No. 201780063930.3 (with English translation), 37 pages.

* cited by examiner

AUTONOMOUS DRIVING SUPPORT APPARATUS AND AUTONOMOUS DRIVING SUPPORT METHOD

TECHNICAL FIELD

The present invention relates to an autonomous driving support apparatus, an autonomous vehicle, an autonomous driving support method, and an autonomous driving support program.

BACKGROUND ART

There is provided an autonomous traveling support system to support autonomous driving using dynamic map data (DMD: Dynamic Map Data) (see Non-Patent Literature 1 and Non-Patent Literature 2). Hereinafter, the dynamic map data may be referred to as DMD.

CITATION LIST

Non-Patent Literature

Non-Patent Literature 1: Council on Competitiveness-Nippon, 2014 Year Project, Final Report, "Services Using Three-dimensional Position Information and Development of Common Platform", Council on Competitiveness-Nippon Non-Patent Literature 2: Modelling of Traffic Situation/Dynamic Map Nissan Motor Co., Ltd. Jan. 29, 2015 SIP-adus <URL: http://www8.cao.go.jp/cstp/gaiyo/sip/iinkai/jidousoukou_media/2kai/shiryou4.pdf>

SUMMARY OF INVENTION

Technical Problem

In order to implement safe autonomous driving, confirmation of user's intention to use autonomous driving, together with various sensors mounted on a vehicle and latest map data, are necessary.

Even an autonomous vehicle that supports the autonomous driving may perform nonautonomous driving. Alternatively, it may happen that a user who purchased the vehicle does not know that the vehicle in which he rides is the autonomous vehicle. Alternatively, it may happen that the user knows that the vehicle is the autonomous vehicle, mainly performs the nonautonomous driving when he usually uses the vehicle, and the autonomous driving is performed in case of emergency. In order to implement the safe autonomous driving even in any case, it is necessary for the user of the autonomous vehicle to recognize whether or not the vehicle in which he rides can perform the autonomous driving. Therefore, in order to implement the safe autonomous driving, the confirmation of the user's intention to use the autonomous driving becomes necessary.

An object of the present invention is to make a user of an autonomous vehicle accurately recognize whether or not the autonomous vehicle can perform autonomous driving.

Solution to Problem

An autonomous driving support apparatus according to the present invention is an autonomous driving support apparatus mounted on an autonomous vehicle to perform autonomous driving using dynamic map data. The autonomous driving support apparatus may include:

a dynamic map storage unit to store the dynamic map data;

a use condition storage unit to store use condition information in which a use condition of the dynamic map data is set; and a determination unit to determine whether or not the autonomous driving by the autonomous vehicle is possible, based on the dynamic map data stored in the dynamic map storage unit and the use condition information stored in the use condition storage unit.

Advantageous Effects of Invention

In the autonomous driving support apparatus according to the present invention, the determination unit determines whether or not the autonomous driving by the autonomous vehicle is possible, based on the dynamic map data and the use condition information in which the use condition of the dynamic map data is set. Thus, according to the autonomous driving support apparatus of the present invention, a user who uses the autonomous vehicle can determine whether or not the vehicle can perform the autonomous driving, so that the user of the autonomous vehicle can be made to readily recognize whether or not the autonomous driving is possible.

DESCRIPTION OF EMBODIMENTS

Figure 1:
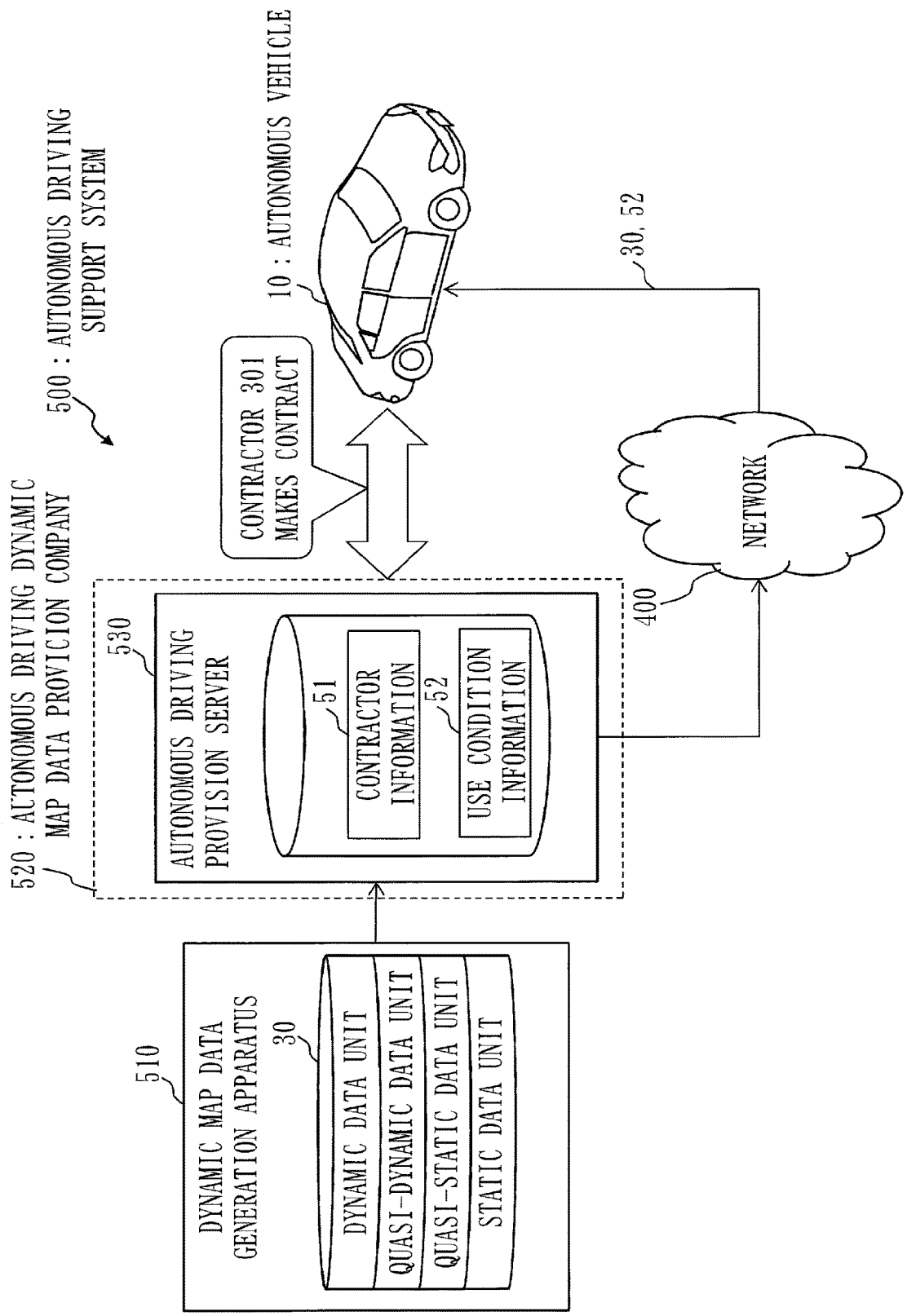
FIG. 1 is a configuration diagram of an autonomous driving support system 500 according to a first embodiment.

Hereinafter, embodiments of the present invention will be described, using the drawings. A same reference numeral is given to the same or equivalent portions in the respective drawings. In the description of the embodiments, explanations of the same or equivalent portions will be suitably omitted or simplified.

First Embodiment

*Description of Configuration*

A configuration of an autonomous driving support system 500 according to this embodiment will be described, using FIG. 1.

The autonomous driving support system 500 includes a dynamic map data generation apparatus 510, an autonomous driving provision server 530 of an autonomous driving dynamic map data provision company 520, and an autonomous vehicle 10. The autonomous driving provision server 530 and the autonomous vehicle 10 are connected via a network 400. The autonomous vehicle 10 is a vehicle that conforms to autonomous driving using dynamic map data 30.

The dynamic map data generation apparatus 510 generates the dynamic map data 30. The dynamic map data generation apparatus 510 applies security to the dynamic map data 30 generated and delivers resulting dynamic map data 30 to the autonomous driving dynamic map data provision company 520.

The dynamic map data 30 is a map dedicated to autonomous driving, and includes a static data portion, a quasi-static data portion, a quasi-dynamic data portion, and a dynamic data portion. The static data portion is mainly map data that becomes a basis. The quasi-static data portion is information, like construction work information, which continues for a long period of time. The quasi-dynamic data portion is information, like traffic congestion information, accident information, or weather information, which changes in a shorter period of time than the quasi-static data portion. The dynamic data portion is information such as coordinates of a pedestrian or a traffic signal, or a position and coordinates of a vehicle, which changes every moment. The dynamic map data 30 is also referred to as basic map data.

The autonomous driving dynamic map data provision company 520 is a company that provides the dynamic map data 30 for a user of the autonomous vehicle 10 so that the autonomous driving can be performed. The autonomous driving dynamic map data provision company 520 includes the autonomous driving provision server 530.

When the user of the autonomous vehicle 10 purchases the autonomous vehicle 10 that supports the autonomous driving, the following cases may be considered. The cases are the one in which the user purchases the autonomous vehicle just because he just wants the autonomous vehicle though he does not decide whether or not to use the autonomous driving function of the autonomous vehicle, the one in which the user purchases the autonomous vehicle because he desires to use the autonomous driving function of the autonomous vehicle, or the one in which the user purchases the autonomous vehicle though he does not use the autonomous driving function. If the autonomous driving function operates due to an erroneous operation of a driver or the like even though he does not intend to use the autonomous function of the autonomous vehicle, as a specific example, it is very dangerous. Therefore, preferably, the user who desires to use the autonomous driving function of the autonomous vehicle registers use of the autonomous driving function in the autonomous driving dynamic map data provision company 520 such as a dealer, an automobile manufacturer, or a map sale company, in advance. Specifically, preferably, the user who desires to use the autonomous driving function of the autonomous vehicle makes a contract for use of the autonomous driving function with the autonomous driving dynamic map data provision company 520 as if he enters into a credit card contract with a credit card company. With this arrangement, latest basic map data is provided from the autonomous driving dynamic map data provision company 520, so that the autonomous driving function can be effectively utilized, using the latest data.

The autonomous driving dynamic map data provision company 520 manages the basic map data related to the autonomous driving by the autonomous vehicle 10. An organization such as the dealer, the automobile manufacturer, or the map sale company is assumed as the autonomous dynamic map data provision company 520, as a specific example. The autonomous driving provision server 530 of the autonomous driving dynamic map data provision company 520 receives the dynamic map data 30 generated by the dynamic map data generation apparatus 510 and delivers the latest dynamic map data 30 to the autonomous vehicle 10 for which the contract for use of the autonomous driving function has been made.

When the contract is made, the autonomous driving provision server 530 registers, in a storage device, a user ID of the user of the autonomous vehicle 10, a password, a version and an expiration term of the dynamic map data 30 that has been delivered, as contractor information 51. Alternatively, a fingerprint of the user of the autonomous vehicle 10 may be registered in the storage device as the contractor information 51. In addition, the autonomous driving provision server 530 may register, in the contractor information 51, information such as a credit card, an ETC (registered trademark) (Electronic Toll Collection) card, a vehicle inspection certificate number, a driver's license number, or a health insurance card number of the user of the autonomous vehicle 10. Then, the autonomous driving provision server 530 delivers, to the autonomous vehicle 10, use condition information 52 in which use conditions for the dynamic map data 30 are set, together with the dynamic map data 30.

Configurations of the autonomous vehicle 10 and an autonomous driving support apparatus 100 according to this embodiment will be described, using FIGS. 2 and 3.

Figure 2:
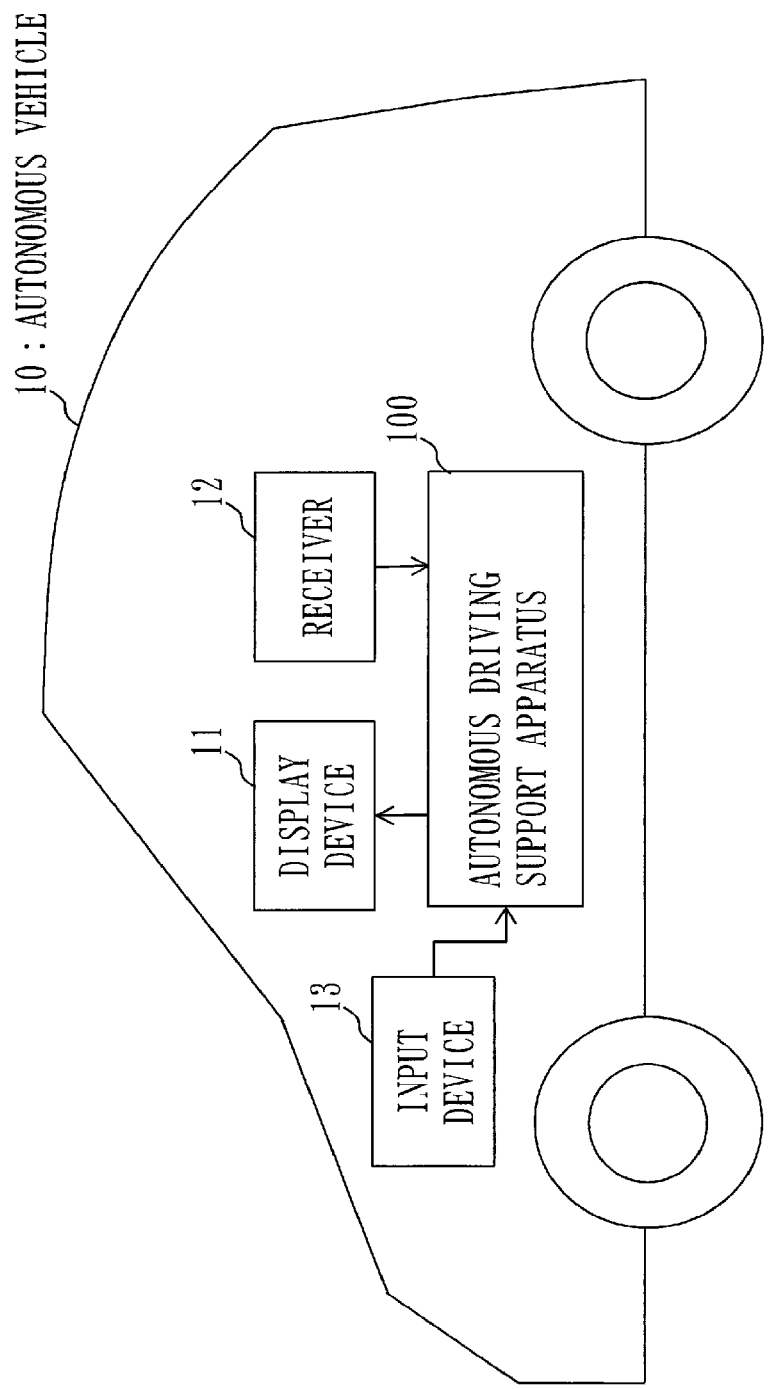
FIG. 2 is a configuration diagram of an autonomous vehicle 10 according to the first embodiment.
Figure 3:
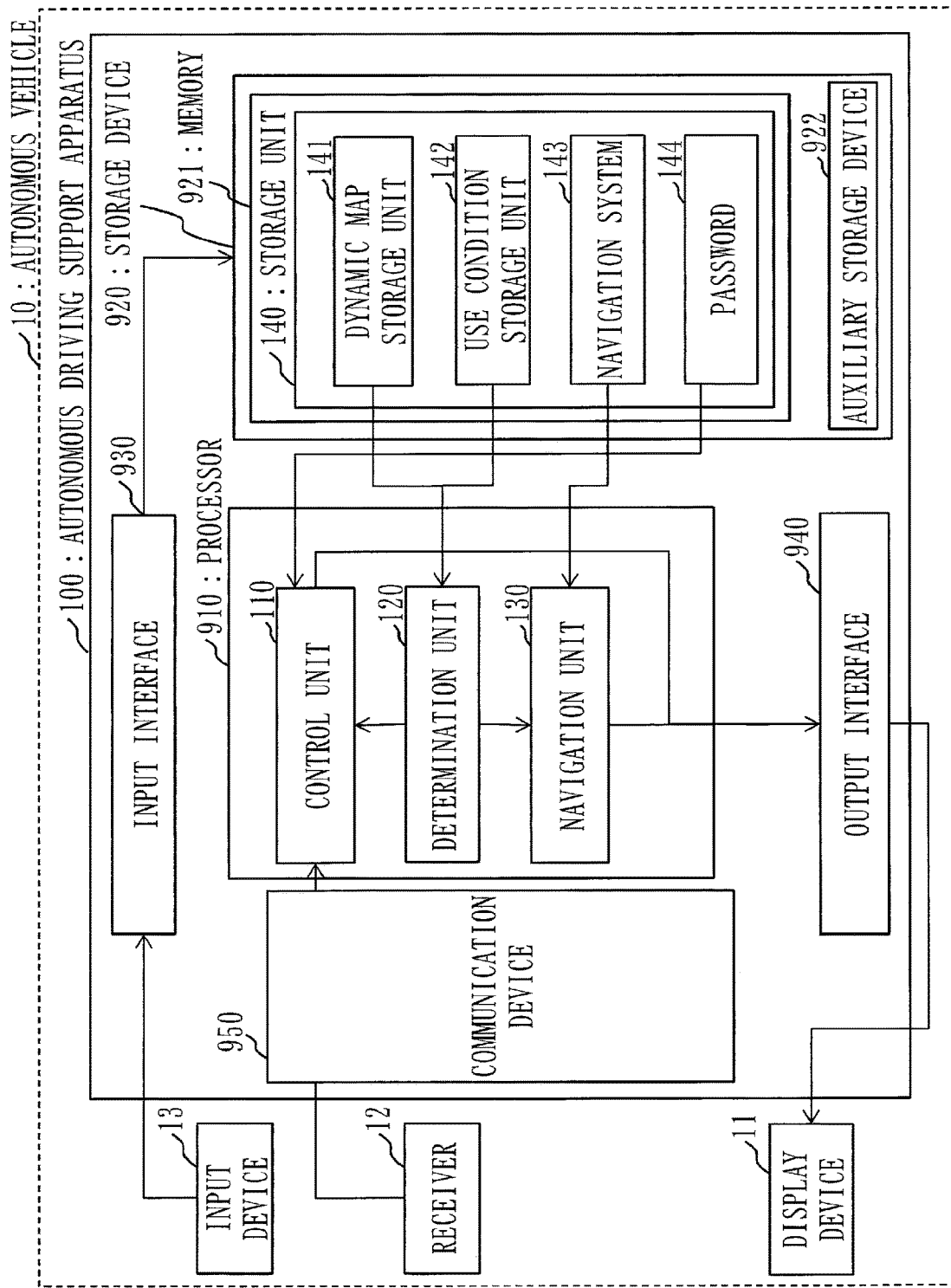
FIG. 3 is a configuration diagram of an autonomous driving support apparatus 100 according to the first embodiment.

As illustrated in FIG. 2, the autonomous vehicle 10 includes the autonomous driving support apparatus 100, and a display device 11, a receiver 12, and an input device 13 that are connected to the autonomous driving support apparatus 100.

In this embodiment, the autonomous driving support apparatus 100 is a computer mounted in the autonomous vehicle 10. The autonomous driving support apparatus 100 includes hardware such as a processor 910, a storage device 920, an input interface 930, an output interface 940, and a communication device 950. The storage device 920 includes a memory 921 and an auxiliary storage device 922.

The autonomous driving support apparatus 100 includes a control unit 110, a determination unit 120, a navigation unit 130, and a storage unit 140, as a functional configuration.

Functions of the control unit 110, the determination unit 120, and the navigation unit 130 are implemented by software.

The storage unit 140 is implemented by the memory 921. A dynamic map storage unit 141, a use condition storage unit 142, a navigation system 143, and a password 144 are stored in the storage unit 140. The dynamic map storage unit 141 stores the dynamic map data 30. The use condition storage unit 142 stores the use condition information 52 in which the use conditions for the dynamic map data 30 are set. Though the storage unit 140 is implemented by the memory 921 in this embodiment, the storage unit 140 may be implemented by the memory 921 and the auxiliary storage device 922, or by the auxiliary storage device 922 alone. An implementation method of the storage unit 140 is arbitrary.

The processor 910 is connected to the other hardware via signal lines and controls these other hardware.

The processor 910 is an IC (Integrated Circuit) to perform processing. Specifically, the processor 910 is a CPU (Central Processing Unit).

Specifically, the auxiliary storage device 922 is a ROM (Read Only Memory), a flash memory, or an HDD (Hard Disk Drive). Specifically, the memory 921 is a RAM (Random Access Memory).

The input interface 930 is a port connected to the input device 13 such as a mouse, a keyboard, or a touch panel. Specifically, the input interface 930 is a USB (Universal Serial Bus) terminal. The input interface 930 may be a port connected to a LAN (Local Area Network).

The input device 13 is connected to the autonomous driving support apparatus 100. The input device 13 accepts a password that is input by the user of the autonomous vehicle 10. Though it is assumed herein that the password is accepted by the user, the fingerprint, a voiceprint, iris authentication, or vein authentication of the user may be accepted instead of the password. The password accepted by the input device 13 is stored in the storage unit 140 via the input interface 930, as the password 144.

The output interface 940 is a port to which a cable of the display device 11 such as a display is connected. Specifically, the output interface 940 is a USB terminal or an HDMI (registered trademark) (High Definition Multimedia Interface) terminal.

Specifically, the display is an LCD (Liquid Crystal Display).

The communication device 950 includes a receiver and a transmitter. Specifically, the communication device 950 is a communication chip or an NIC (Network Interface Card). The communication device 950 functions as a communication unit to communicate data. The receiver functions as a receiving unit to receive data, and the transmitter functions as a transmitting unit to transmit data.

A program to implement the functions of the control unit 110, the determination unit 120, and the navigation unit 130 is stored in the auxiliary storage device 922. The program to implement the functions of the control unit 110, the determination unit 120, and the navigation unit 130 is also referred to as an autonomous driving support program 502. This program is loaded into the memory 921, is loaded by the processor 901, and is executed by the processor 910. An OS (Operating System) is also stored in the auxiliary storage device 922. At least a part of the OS is loaded into the memory 921, and the processor 910 executes the program to implement the functions of the control unit 110, the determination unit 120, and the navigation unit 130 while executing the OS.

The autonomous driving support apparatus 100 may include only one processor 910 or may include a plurality of the processors 910. The plurality of the processors 910 may cooperate and execute the program to implement the functions of the control unit 110, the determination unit 120, and the navigation unit 130.

Information, data, signal values, and variable values indicating results of processes of the control unit 110, the determination unit 120, and the navigation unit 130 are stored in the auxiliary storage device 922, the memory 921 or a register or a cache memory in the processor 910.

An arrow connecting each unit of the control unit 110, the determination unit 120, and the navigation unit 130 and the storage unit 140 indicates that each unit stores a process result in the storage unit 140, or that each unit reads information from the storage unit 140. Arrows connecting the respective units each indicate a control flow.

The program to implement the functions of the control unit 110, the determination unit 120, and the navigation unit 130 may be stored in a portable recording medium such as a magnetic disk, a flexible disk, an optical disk, a compact disk, a blue ray (registered trademark) disk, or a DVD (Digital Versatile Disc).

What is referred to as an autonomous driving support program product is a storage medium and a storage device in which the program to implement the function that is described as each unit of the control unit 110, the determination unit 120, and the navigation unit 130 is recorded. That is, the autonomous driving support program product loads a computer-readable program of any appearance.

*Description of Operations*

Figure 4:
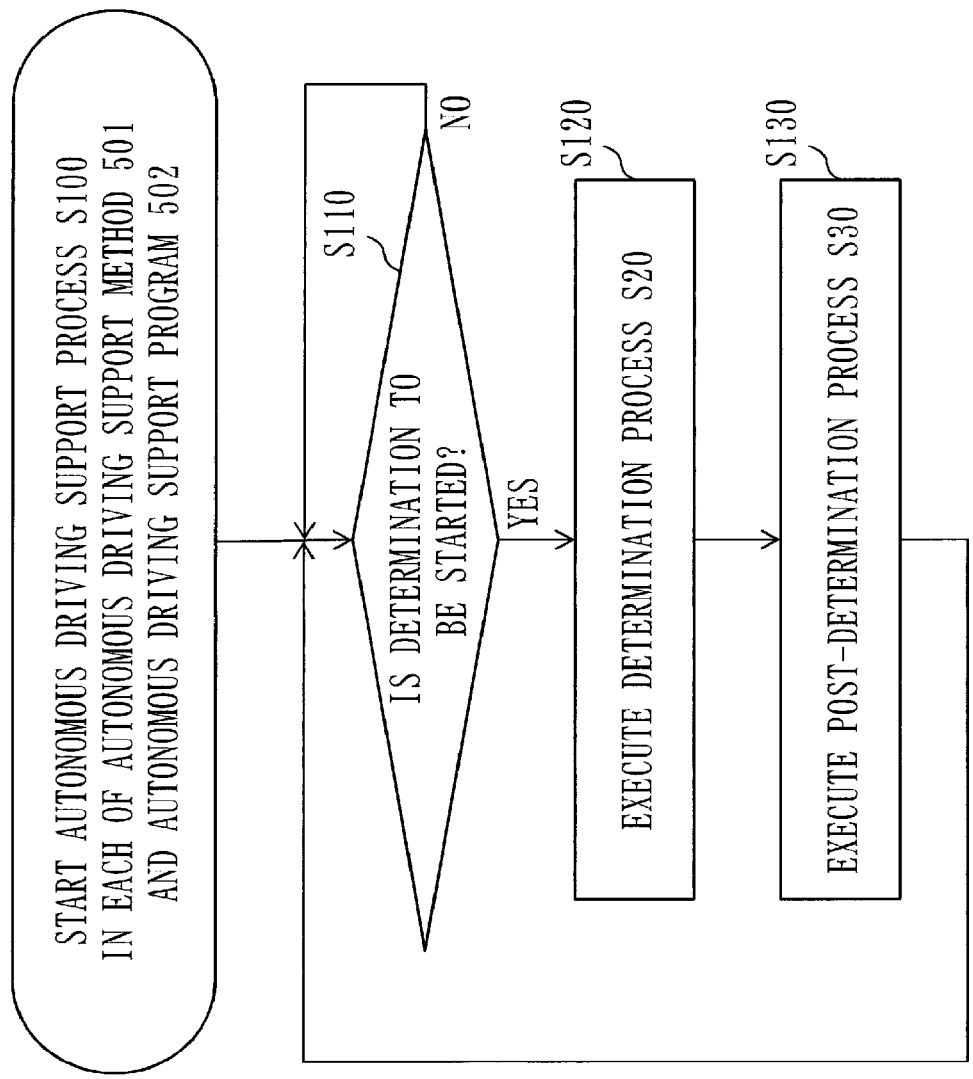
FIG. 4 is a flow diagram of an autonomous driving support process S100 in each of an autonomous driving support method 501 and an autonomous driving support program 502 of the autonomous driving support apparatus 100 according to the first embodiment.

Operations of an autonomous driving support process S100 in each of an autonomous driving support method 501 and the autonomous driving support program 502 of the autonomous driving support apparatus 100 according to this embodiment will be described, using FIG. 4.

In step S110, the control unit 110 determines whether or not to start a determination process S20 by the determination unit 120. It is assumed that the autonomous driving support apparatus 100 periodically determines whether or not the autonomous driving by the autonomous vehicle 10 is possible. Specifically, the control unit 110 first determines to start the determination process S20 immediately after the autonomous driving support program 502 has been started. Immediately after the autonomous driving support program 502 has been started means immediately after the engine of the autonomous vehicle 10 has been started. Thereafter, the control unit 110 determines to start the determination process S20 if a current time is a regular time from when it has been determined last to start the determination process S20. If the control unit 110 has determined to start the determination process S20, the control unit 110 proceeds to step S120. If the control unit 110 has not determined to start the determination process S20, the control unit 110 repeats step S110.

In step S120, the determination unit 120 executes the determination process S20 of determining whether or not the autonomous driving by the autonomous vehicle 10 is possible, based on the dynamic map data 30 stored in the dynamic map storage unit 141 and the use condition information 52 stored in the use condition storage unit 142. Details of the determination process S20 will be described later.

In step S130, the control unit 110 executes a post-determination process S30, based on a result of the determination process S20 by the determination unit 120. Details of the post-determination process S30 will be described later.

Operations of the determination process S20 according to this embodiment will be described, using FIG. 5.

Figure 6:
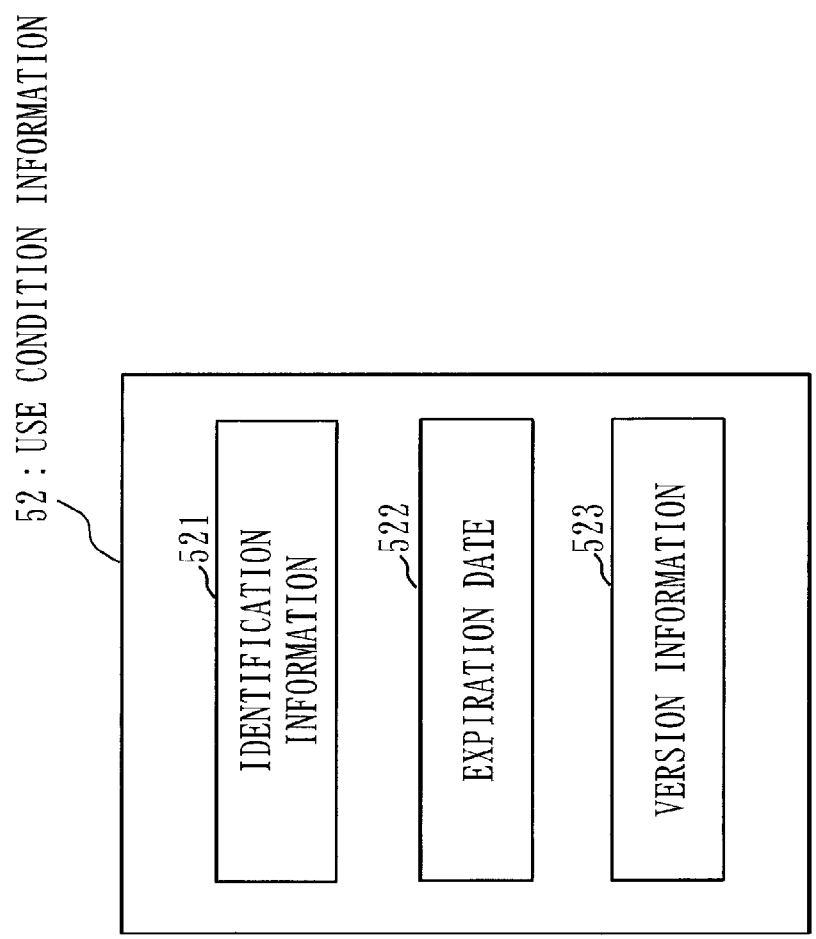
FIG. 6 is a diagram illustrating an example of use condition information 52 according to the first embodiment.

An example of the use condition information 52 according to this embodiment will be described, using FIG. 6. The use conditions for the dynamic map data 30 are set in the use condition information 52. The use condition information 52 is information that is delivered from the autonomous driving dynamic map data provision company 520 in advance. As a specific example, the use condition information 52 includes identification information 521, an expiration term 522, and version information 523. Information for identifying a contractor 301 for whom the autonomous driving by the autonomous vehicle 10 has been permitted is set in the identification information 521. Specifically, the password that the user of the autonomous vehicle 10 has registered when he makes the contract for the autonomous driving with the autonomous driving provision server 530 is set in the identification information 521. A date and time indicating the deadline of the valid period of the dynamic map data 30 is set in the expiration term 522. Information indicating an effective version that can be used among versions of the dynamic map data 30 is set in the version information 523.

It is assumed that these identification information 521, expiration term 522 and version information 523 are registered when the user of the autonomous vehicle 10 makes the contract for the autonomous driving with the autonomous driving dynamic map data provision company 520 and is stored in the storage device of the autonomous driving provision server 530. In the autonomous driving provision server 530, these identification information 521, expiration term 522 and version information 523 at the time of the registration are stored in the storage device as the contractor information 51, in association with the user ID for identifying the user. It is assumed that update of the contractor information 51 of the user is possible and that the use condition information 52 of the autonomous vehicle 10 is also updated as necessary when the contractor information 51 is updated.

In step S121, based on the password 144 accepted by the input device 13 and the identification information 521 included in the use condition information 52, the determination unit 120 determines that the autonomous driving is possible if the user is the contractor 301 for whom the autonomous driving has been permitted. The password 144 is an example of user identification data 440 for identifying the user of the autonomous vehicle 10. In this embodiment, the password 144 is used as the example of the user identification data 440. However, as described above, the fingerprint, the voiceprint, the iris authentication, or the vein authentication of the user of the autonomous vehicle 10 may be used as an example of the user identification data 440. The fingerprint of the user in this case is the example of the user identification data 440 for identifying the user of the autonomous vehicle 10. Specifically, the determination unit 120 compares the password 144 stored in the storage unit 140 with the identification information 521 included in the use condition information 52 and determines whether the password 144 and the identification information 521 match each other. If the password 144 matches the identification information 521, the determination unit 120 proceeds to step S122. If the password 144 does not match the identification information 521, the determination unit 120 proceeds to step S125.

In step S122, the determination unit 120 determines that the autonomous driving is possible if the current time is before the expiration term 522. Specifically, the determination unit 120 obtains the expiration term 522 included in the use condition information 52 and determines whether or not the current time is before the expiration term 522. If the current time is before the expiration term 522, the determination unit 120 proceeds to step S123. If the current time is past the expiration term 522, the determination unit 120 proceeds to step S125.

In step S123, the determination unit 120 determines that the autonomous driving is possible if a version of the dynamic map data 30 stored in the dynamic map storage unit 141 matches the version information 523 included in the use condition information 52. Specifically, the determination unit 120 obtains the version of the dynamic map data 30 stored in the dynamic map storage unit 141 and the version information 523 included in the use condition information 52. The determination unit 120 determines whether or not the version of the dynamic map data 30 matches the version information 523. If the versions match each other, the determination unit 120 proceeds to step S124. If the versions do not match each other, the determination unit 120 proceeds to step S125.

In step S124, the determination unit 120 determines that the autonomous driving is possible. In step S125, the determination unit 120 determines that the autonomous driving is not possible.

Figure 5:
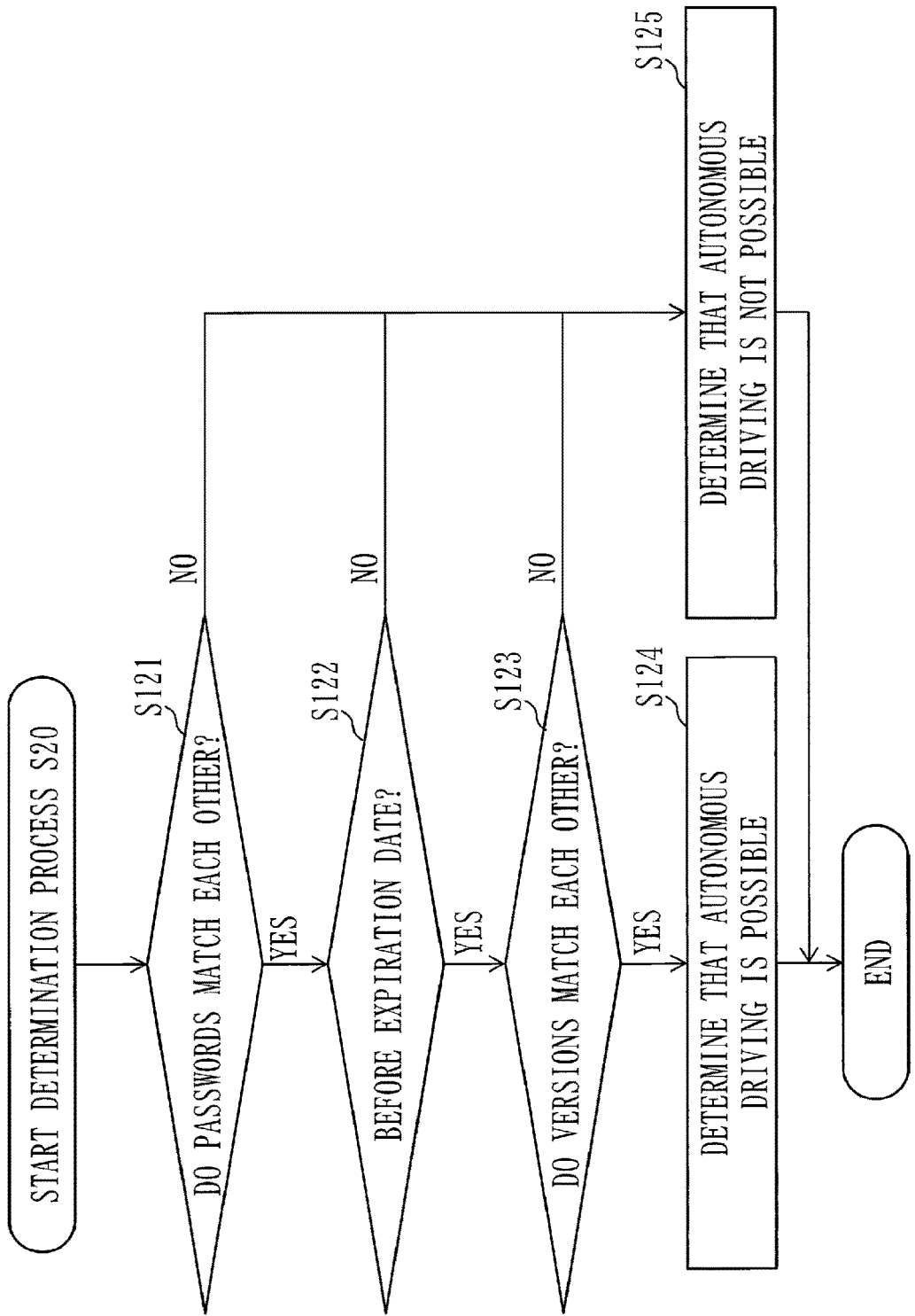
FIG. 5 is a flow diagram of a determination process S20 according to the first embodiment.

In the determination process S20 in FIG. 5, the determination unit 120 has determined that the autonomous driving is possible if all of the conditions with respect to the password, the expiration term, and the version are all satisfied. The determination unit 120 may, however, determine that the autonomous driving is possible if at least one of the conditions is satisfied. That is, based on the password 144 accepted by the input device 13 and the identification information 521 included in the use condition information 52, the determination unit 120 may determine that the autonomous driving is possible if the user is the contractor 301 for whom the autonomous driving has been permitted. Alternatively, the determination unit 120 may determine that the autonomous driving is possible if the current time is before the expiration term 522. The determination unit 120 may determine that the autonomous driving is possible if the version of the dynamic map data 30 stored in the dynamic map storage unit 141 matches the version information 523 included in the use condition information 52.

Figure 7:
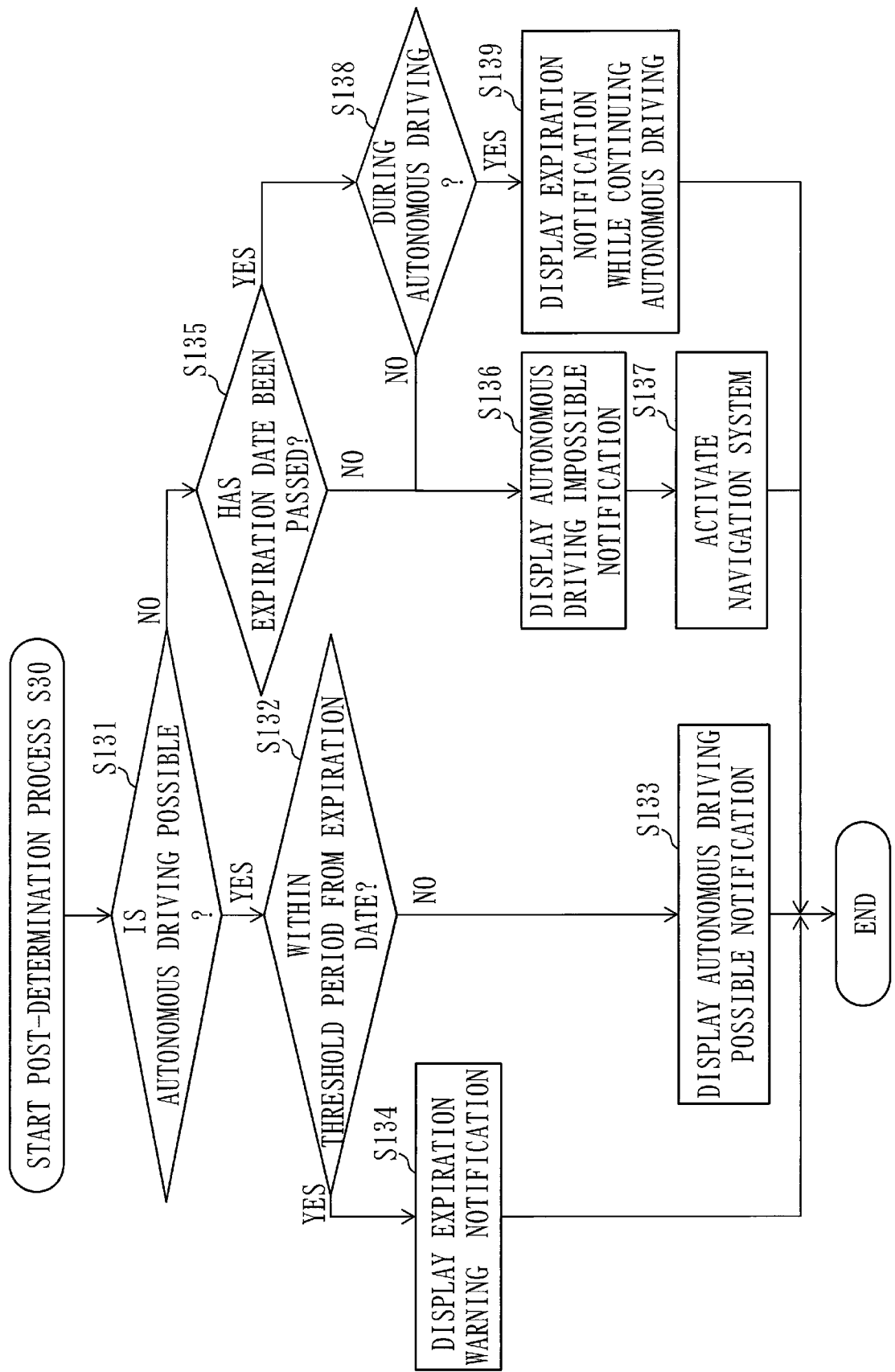
FIG. 7 is a flow diagram of a post-determination process S30 according to the first embodiment.

Subsequently, operations of the post-determination process S30 according to this embodiment will be described, using FIG. 7. The post-determination process S30 is a process to be executed by the control unit 110, based on a result of the determination in the determination process S20.

In step S131, the control unit 110 determines whether or not the result of the determination in the determination process S20 indicates whether or not the autonomous driving is possible. If the result of the determination indicates that the autonomous driving is possible, the control unit 110 proceeds to step S132. If the result of the determination indicates that the autonomous driving is not possible, the control unit 110 proceeds to step S135.

In step S132, the control unit 110 determines whether or not the current time is within a threshold period from the expiration term 522. If the current time is within the threshold period from the expiration term 522, the control unit 110 proceeds to step S134. If the current time is away from the expiration term 522 by the threshold period or more, the control unit 110 proceeds to step S133. It is assumed that the threshold period is set by the user in advance and change of the threshold period is also possible. The threshold period may be stored in the storage unit 140 as a threshold period 145.

In step S133, the control unit 110 displays, on the display device 11, an autonomous driving possible notification indicating that the autonomous driving is possible. That is, if the autonomous driving has been determined to be possible by the determination unit 120 and the current time has a sufficient margin to the expiration term 522, the control unit 110 displays, on the display device 11, the autonomous driving possible notification indicating that the autonomous driving is possible. On the other hand, in step S134, if the current time is within the threshold period from the expiration term 522, the control unit 110 displays, on the display device 11, an expiration warning notification indicating that the expiration term 522 will expire within the threshold period.

In step S135, the control unit 110 determines whether or not the current time has passed the expiration term 522. If the current time has passed the expiration term 522, the control unit 110 proceeds to step S138. If the current time has not passed the expiration term 522, the control unit 110 proceeds to step S136.

In step S136, the control unit 110 displays, on the display device 11, an autonomous driving impossible notification indicating that the autonomous driving is not possible. On this occasion, the control unit 110 includes, in the autonomous driving impossible notification, a reason why the autonomous driving is not possible, and displays the reason.

In step S137, the control unit 110 displays, on the display device, the autonomous driving impossible notification indicating that the autonomous driving is not possible and instructs the navigation unit 130 to execute the navigation system 143 if the autonomous driving has been determined not to be possible by the determination unit 120. The navigation system 143 includes data such as navigation map data or facility information. Specifically, the control unit 110 activates the navigation unit 130. The navigation unit 130 displays, on the display device 11, the navigation map data of the navigation system 143 stored in the storage unit 140 via the output interface 940, thereby activating the navigation system. It may also be so arranged that the control unit 110 displays, on the display device 11, a confirmation message to make the user input whether or not the user needs use of the navigation system and determines whether or not to activate the navigation system according to whether or not the use of the navigation system by the user is needed, rather than activating the navigation unit 130.

In step S138, the control unit 110 determines whether or not the autonomous vehicle 10 is performing the autonomous driving. If the autonomous vehicle 10 is not performing the autonomous driving, the control unit 110 proceeds to step S136. If the autonomous vehicle 10 is performing the autonomous driving, the control unit 110 proceeds to step S139. That is, if the expiration term 522 of the dynamic map data 30 has passed not during the autonomous driving, the control unit 110 displays the autonomous driving impossible notification indicating that the autonomous driving has become not possible due to the expiration of the expiration term 522 and activates the navigation system.

In step S139, the control unit 110 continues the autonomous driving if the expiration term 522 has passed during the autonomous driving by the autonomous vehicle 10 and displays an expiration notification indicating that the expiration term 522 has passed. That is, if the expiration term 522 has passed during the autonomous driving, the control unit 110 continues the autonomous driving and displays the expiration notification on the display device 11.

If the autonomous driving has been determined to be possible by the determination unit 120, the control unit 110 controls the autonomous driving based on the dynamic map data 30. Specifically, if the user of the autonomous vehicle 10 has input an instruction to start the autonomous driving after he confirmed the autonomous driving possible notification displayed on the display device 11, the control unit 110 causes the autonomous driving to be started based on the dynamic map data 30.

\*\*\*Alternative Configuration\*\*\*

In the determination process S20 in FIG. 5 in this embodiment, the determination unit 120 has determined that the autonomous driving is possible if the passwords have matched each other, the current time is before the expiration term 522, and the versions of the dynamic map data 30 match each other. However, the conditions for the determination are not limited to these conditions, and the determination may be made as to whether or not the autonomous driving is possible, using a different condition.

As a specific example, it may be so arranged that the contractor of the autonomous driving registers the credit card in the autonomous driving dynamic map data provision company 520 in advance, and possibility of the autonomous driving is determined, using the credit card. Alternatively, it may be so arranged that the contractor of the autonomous driving registers the ETC (registered trademark) card in the autonomous driving dynamic map data provision company 520 in advance and the possibility of the autonomous driving is determined, using the ETC (registered trademark) card inserted into an ETC (registered trademark) card reader. Alternatively, it may be so arranged that the contractor of the autonomous driving registers the vehicle inspection certificate number in the autonomous driving dynamic map data provision company 520 in advance and the possibility of the autonomous driving is determined, using the vehicle inspection certificate number. In addition, information such as the driver's license number, the health insurance card number, or the national identification number, by which an individual who makes the contract for the autonomous driving can be identified, may be used as a use condition for the dynamic map data 30.

The autonomous driving support apparatus 100 may include autonomous driving possibility/impossibility information in the storage unit 140. Specifically, it may he so arranged that, in the step S133, the step S134, or the step S139 in FIG. 7, the control unit 110 displays, on the display device 11, the autonomous driving possible notification, the expiration warning notification, or the expiration notification, and sets, in the autonomous driving possibility/impossibility information in the storage unit 140, that the autonomous driving is possible. Further, it may be so arranged that in step S136 in FIG. 7, the control unit 110 displays the autonomous driving impossible notification on the display device 11 and sets, in the autonomous driving possibility/impossibility information in the storage unit 140, that the autonomous driving is not possible.

In this embodiment, the functions of the control unit 110, the determination unit 120, and the navigation unit 130 of the autonomous driving support apparatus 100 are implemented by the software. However, as a variation example of the autonomous driving support apparatus 100 according to this embodiment, the functions of the control unit 110, the determination unit 120, and the navigation unit 130 may be implemented by hardware.

Figure 8:
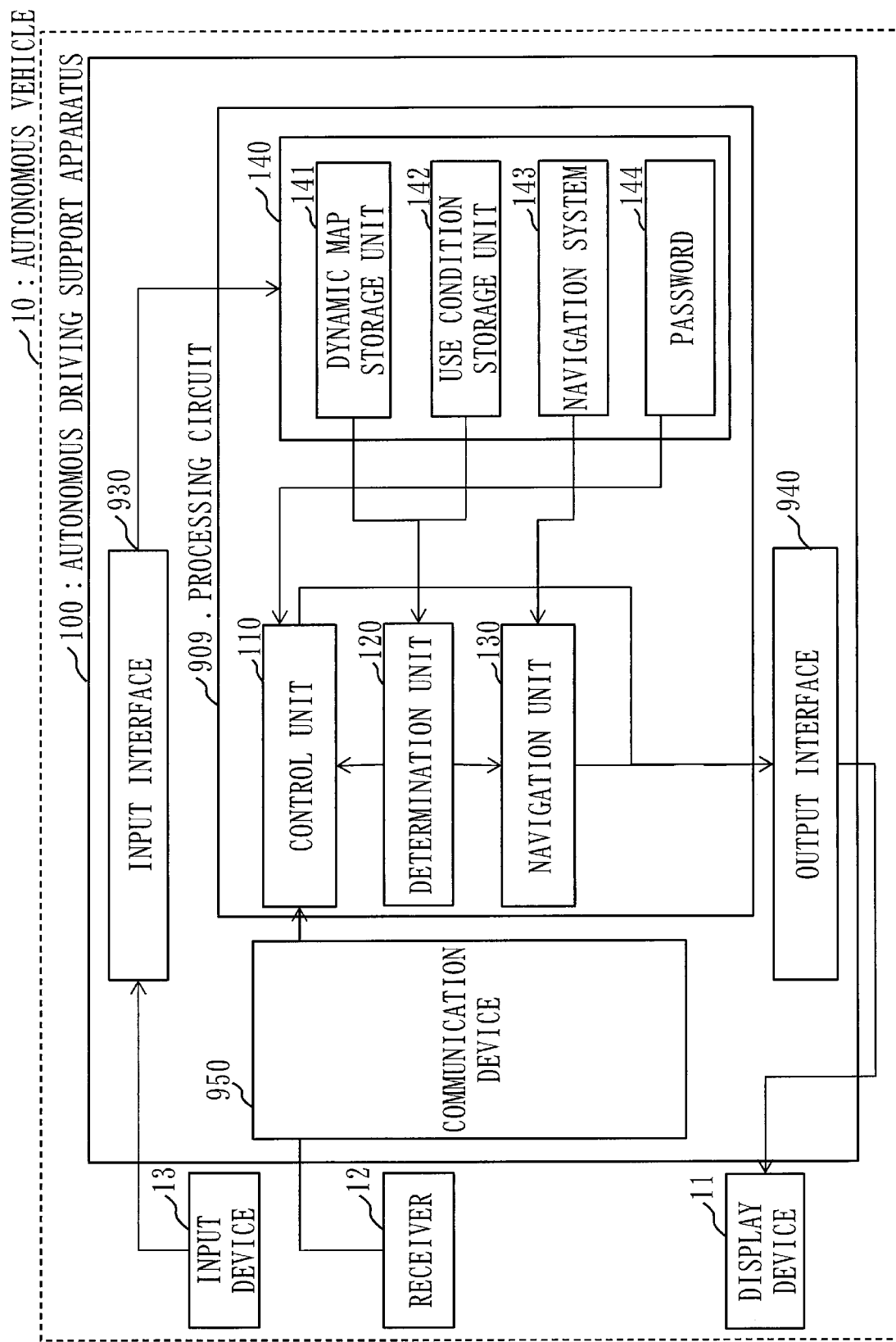
FIG. 8 is a configuration diagram of the autonomous driving support apparatus 100 according to a variation example of the embodiment.

A configuration of the autonomous driving support apparatus 100 according to the variation example of this embodiment will be described, using FIG. 8. As illustrated in FIG. 8, the autonomous driving support apparatus 100 includes the hardware such as a processing circuit 909, the input interface 930, the output interface 940, and the communication device 950.

The processing circuit 909 is a dedicated electronic circuit to implement the storage unit 140 and the functions of the control unit 110, the determination unit 120, and the navigation unit 130. Specifically, the processing circuit 909 is a single circuit, a composite circuit, a programmed processor, a parallel-programmed processor, a logic IC, a GA, an ASIC, or an FPGA. The GA is an abbreviation for Gate Array. The ASIC is an abbreviation for Application Specific Integrated Circuit. The FPGA is an abbreviation for Field-Programmable Gate Array.

The functions of the control unit 110, the determination unit 120, and the navigation unit 130 may be implemented by one processing circuit 909 or may be distributed into a plurality of the processing circuits 909 and may be implemented.

As another variation example, the functions of the autonomous driving support apparatus 100 may be implemented by a combination of software and hardware. That is, a part of the functions of the autonomous driving support apparatus 100 may be implemented by the hardware dedicated to the implementation of the part of the functions of the autonomous driving support apparatus 100, and a remainder of the functions may be implemented by the software.

The processor 910, the storage device 920, and the processing circuit 909 are collectively referred to as "processing circuitry". That is, even if the configuration of the autonomous driving support apparatus 100 is the configuration illustrated in one of FIGS. 3 and 8, the storage unit 140 and the functions of the control unit 110, the determination unit 120, and the navigation unit 130 are implemented by the processing circuitry.

Each "unit" of the control unit 110, the determination unit 120, and the navigation unit 130 may be read as a "step", a "procedure", or a "process. The functions of the control unit 110, the determination unit 120, and the navigation unit 130 may be implemented by firmware.

*Description of Effects of this Embodiment*

According to the autonomous driving support apparatus 100 in this embodiment, the control unit permits the autonomous driving if the use condition information indicating whether or not the autonomous driving is possible indicates that the autonomous driving is possible. That is, according to the autonomous driving support apparatus 100 in this embodiment, even if a vehicle is the one that supports autonomous traveling, it is determined whether or not autonomous traveling using the DMD is possible. Accordingly, a state that is not safe for the autonomous traveling, such as transition to an autonomous traveling state not intended by a user who rides in a vehicle that can perform the autonomous traveling when he does not intend execution of autonomous driving, or execution of the autonomous traveling even if the user does not possess map data suitable for the autonomous traveling, can be avoided. Safe autonomous traveling can be therefore implemented. As mentioned above, according to the autonomous driving support apparatus 100 in this embodiment, the user is made to recognize that the vehicle in which he rides performs the autonomous driving and the autonomous driving using latest map data can be implemented.

In the autonomous driving support apparatus 100 in this embodiment, the control unit causes the display device to display a map to a destination or a route research result when the use condition information indicates that the autonomous driving is not possible. Consequently, according to the autonomous driving support apparatus 100 in this embodiment, a navigation result using a static map is displayed even if the autonomous traveling cannot be performed. Thus, the user can recognize that the autonomous traveling cannot be performed and can perform driving based on the navigation result.

In the autonomous driving support apparatus 100 according to this embodiment, the use condition information includes information indicating the expiration term that can be updated. The control unit determines that the autonomous driving is possible if a time when the autonomous driving is started is before the expiration term. Consequently, according to the autonomous driving support apparatus 100 in this embodiment, by providing the expiration term, an intention of the autonomous traveling is periodically updated by the user, thereby making it possible for the user to recognize execution of the autonomous traveling. Thus, the safe autonomous traveling can be implemented.

In the autonomous driving support apparatus 100 according to this embodiment, when a specific identification number associated with the control part, or the password is input, the control unit determines that the autonomous driving is possible, based on the password and the identification information in the use condition information. According to the autonomous driving support apparatus 100 in this embodiment, by making the user input the password or the user ID, the user is made to confirm the intention of execution of the autonomous driving. Thus, a situation where the autonomous driving is performed without being intended by the user can be avoided.

In the autonomous driving support apparatus 100 according to this embodiment, the control unit determines that the autonomous driving is not possible if the expiration term has passed. Alternatively, the control unit sets, in the autonomous driving possibility/impossibility information in the storage unit, that the autonomous driving is not possible. Consequently, according to the autonomous driving support apparatus 100 in this embodiment, the intention of the autonomous driving can be periodically confirmed. Thus, the autonomous driving can be safely performed.

In the autonomous driving support apparatus 100 according to this embodiment, the control unit causes the display device to display that the valid period will expire soon if a current time is within the threshold period from the expiration term. Consequently, according to the autonomous driving support apparatus 100 in this embodiment, the user is prompted to update the expiration term and is made to input the intention of the autonomous driving again. The autonomous driving can be thereby performed safely.

In the autonomous driving support apparatus 100 according to this embodiment, if the expiration term has passed, the control unit continues the autonomous driving and causes the display device to display that the valid period has expired. Consequently, according to the autonomous driving support apparatus 100 in this embodiment, the autonomous driving is continued, thereby not providing to the user a psychological threat due to an abrupt change to nonautonomous driving. The user is prompted to input the intention of the autonomous driving again, and the autonomous driving can be thereby performed.

In the autonomous driving support apparatus 100 according to this embodiment, the fingerprint of the user may be used instead of the password, as the use condition that has been authenticated. Due to this arrangement, the owner and the user of the autonomous vehicle 10 can be managed, and even a family of the owner is made not to unnecessarily perform an operation for the autonomous driving. An accident that may be caused by an erroneous operation for the autonomous vehicle 10 can be thereby prevented.

In the autonomous driving support apparatus 100 according to this embodiment, it has been assumed that immediately after the autonomous driving support program 502 has been activated means immediately after the engine of the autonomous vehicle 10 has been started. It may be so arranged, however, that the autonomous driving support apparatus 100 is connected to the battery of the autonomous vehicle 10 and that the control unit is constantly activated by power from the battery With this arrangement, the control unit can constantly determine whether or not the autonomous driving by the autonomous vehicle 10 is possible. That is, by connection of the autonomous driving support apparatus 100 to the battery of the autonomous vehicle 10, the autonomous driving support program 502 can be constantly activated and a current time and the expiration term 522 can be constantly monitored and confirmed. It may be so arranged that, like turning on of a red brake lamp when the driver has applied a brake, an autonomous driving lamp turns on or blinks when the autonomous driving is possible and the autonomous driving lamp is turned off when the autonomous driving is not possible, for notification to the user, in the autonomous driving support apparatus 100.

Second Embodiment

*Description of Configuration* In this embodiment, a difference from the first embodiment will be mainly described.

In this embodiment, a same reference numeral is given to a component that is similar to the one described in the first embodiment, and description of the component may be omitted.

Figure 9:
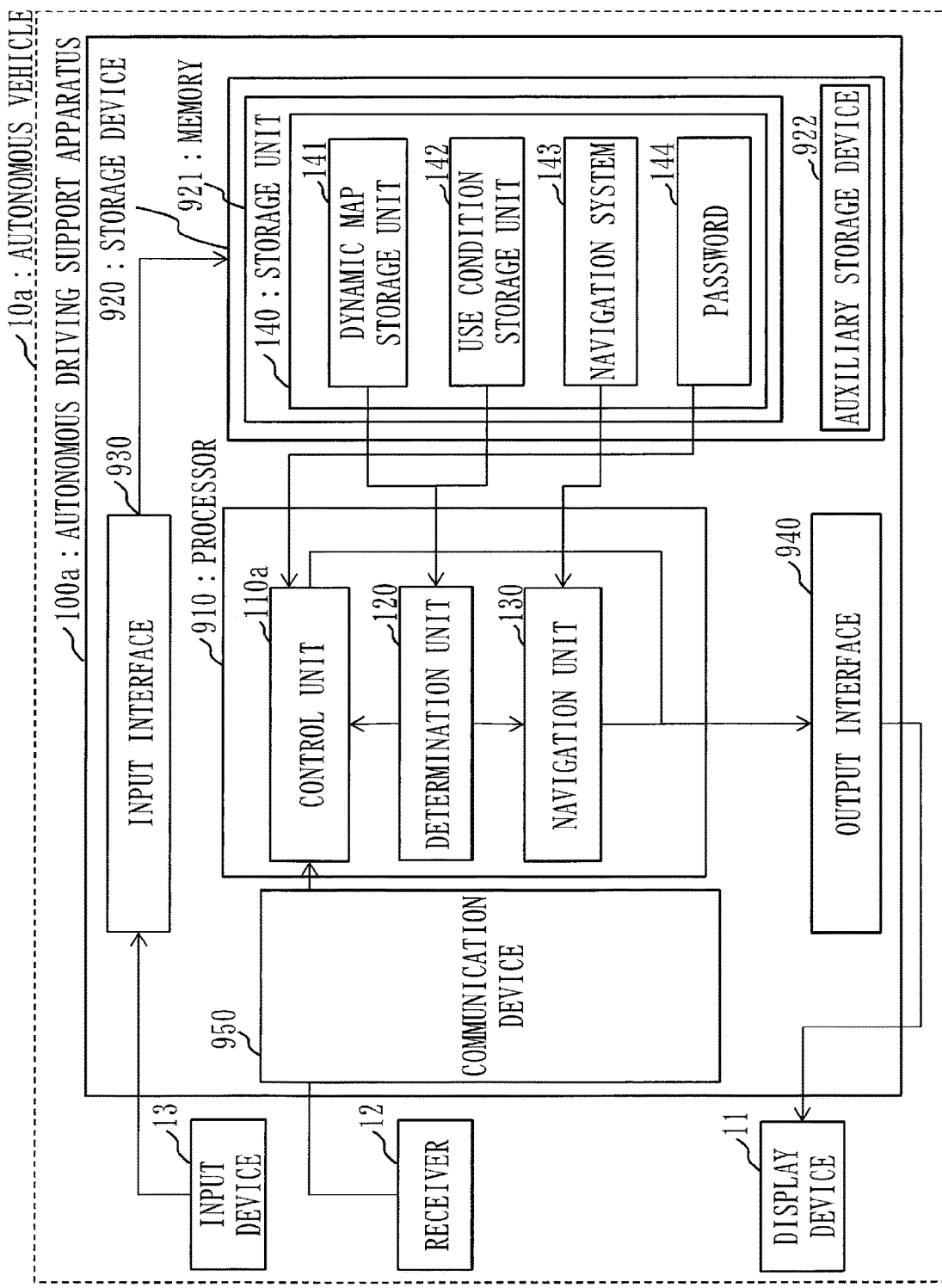
FIG. 9 is a configuration diagram of an autonomous vehicle 10a and an autonomous driving support apparatus 100a according to a second embodiment.

Configurations of an autonomous driving support system 500a, an autonomous driving support apparatus 100a, and an autonomous vehicle 10a according to this embodiment will be described, using FIGS. 9 and 10.

It is assumed that, in the autonomous driving support system 500a according to this embodiment, when the autonomous vehicle 10a is traveling on an autonomous driving route 700, the autonomous vehicle 10a receives dynamic map data from an infrastructure server 540 that is one of infrastructures. As a specific example of the autonomous driving route 700, a highway can be pointed out. It is assumed that the dynamic map data that is received from the infrastructure server 540 on the autonomous driving route 700 is reception dynamic data 30a. Illustration of the dynamic map data generation apparatus 510 and the autonomous driving provision server 530 is omitted in FIG. 10. The autonomous driving support apparatus 100a includes a function of displaying, on the display device 11, an obstacle notification corresponding to a current position when the reception dynamic data 30a includes traveling obstacle information that may give an obstacle to traveling.

Basic configurations of the autonomous driving support system 500a, the autonomous driving support apparatus 100a, and the autonomous vehicle 10a according to this embodiment are the same as those described in the first embodiment.

In this embodiment, in place of the control unit 110 in the first embodiment, a control unit 110a is included.

In addition of the function of the control unit 110 described in the first embodiment, the control unit 110a includes the following function.

The control unit 110a controls autonomous driving by the autonomous vehicle 10a on the autonomous driving route 700 including a plurality of traveling sections, based on the reception dynamic data 30a and dynamic map data 30 stored in the dynamic map storage unit 141. Based on the reception dynamic data 30a and the dynamic map data 30 stored in the dynamic map storage unit 141, the control unit 110a determines whether or not there is a traveling obstacle section AX including traveling obstacle information among the plurality of traveling sections. The control unit 110a displays the obstacle notification on the display device 11, based on a positional relationship between the current position of the autonomous vehicle 10a and the traveling obstacle section AX.

As explained in the first embodiment, the reception dynamic data 30a includes information such as traffic congestion information, accident information or monitoring camera information, which dynamically changes. It is assumed that these pieces of the information are set to traveling support information 31 to support the autonomous driving by the autonomous vehicle 10a. The traveling support information 31 is included in the reception dynamic data 30a.

*Description of Operations*

Figure 10:
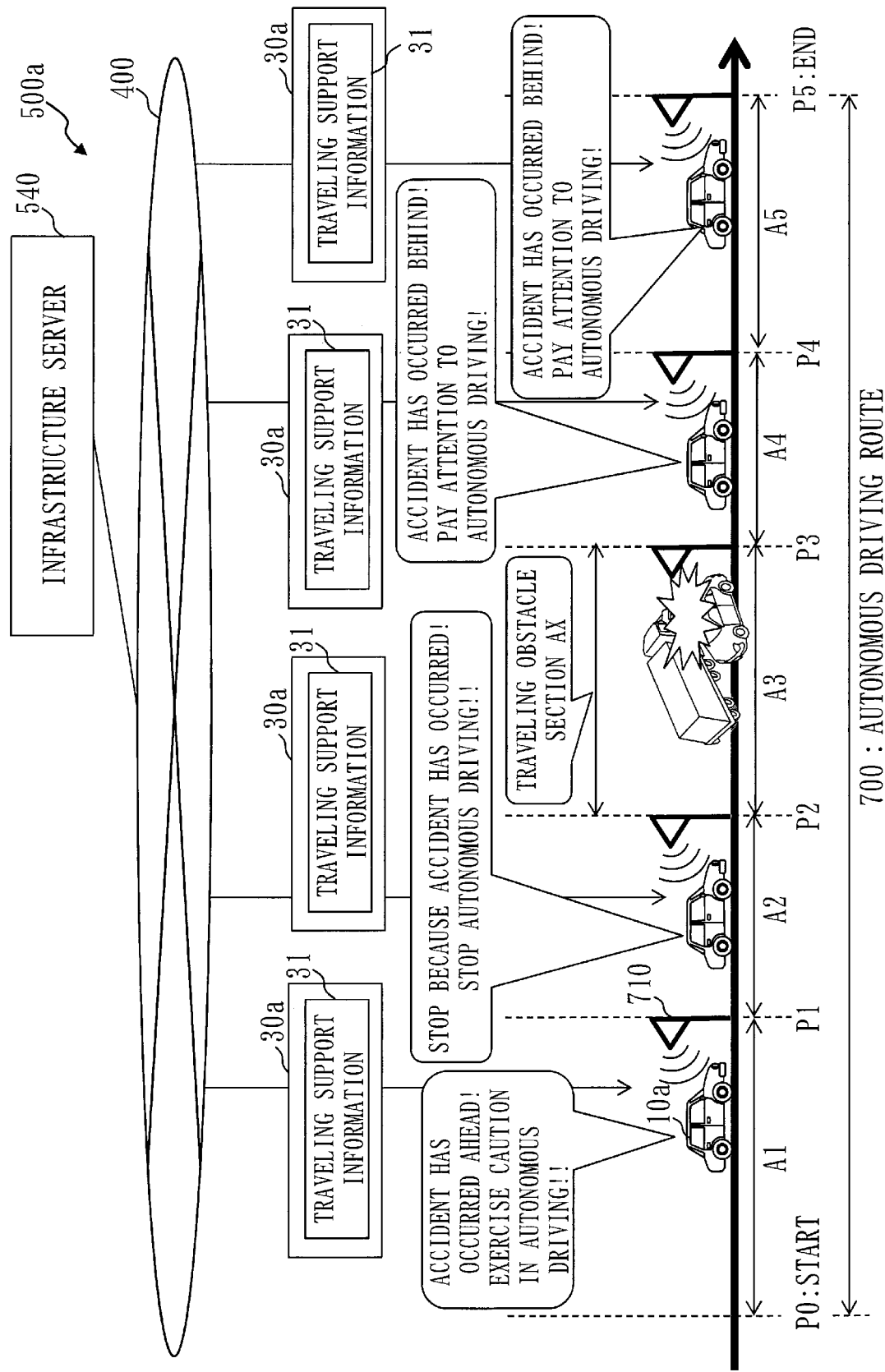
FIG. 10 is a diagram illustrating operations of an autonomous driving support system 500a according to the second embodiment.

FIG. 10 illustrates a support information reception process in the autonomous driving support system 500a according to this embodiment. The autonomous driving support apparatus 100a is mounted on the autonomous vehicle 10a and includes the output interface 940 connected to the display device 11 of the autonomous vehicle 10a and the communication device 950 connected to the receiver 12 of the autonomous vehicle 10a. The dynamic map storage unit 141 stores the dynamic map data 30 to be used by the autonomous driving by the autonomous vehicle 10a.

Referring to FIG. 10, the autonomous vehicle 10a performs the autonomous driving on the autonomous driving route 700 including the plurality of traveling sections. It is assumed that the autonomous vehicle 10a is performing the autonomous driving on the autonomous driving route 700. The autonomous driving route 700 is a route from a P0 point that is a starting point to a P5 point that is an end point. It is assumed that a P0-P1 section is set to a traveling section A1, a P1-P2 section is set to a traveling section A2, a P2-P3 section is set to a traveling section A3, a P3-P4 section is set to a traveling section A4, and a P4-P5 section is set to a traveling section A5. A support information delivery apparatus 710 to deliver the reception dynamic data 30a is set at each of a P1 point, a P2 point, a P3 point, a P4 point, and the P5 point. The support information delivery apparatus 710 receives the reception dynamic data 30a from the infrastructure server 540 and delivers the reception dynamic data 30a received to the autonomous vehicle 10a that travels on a corresponding traveling section.

Figure 11:
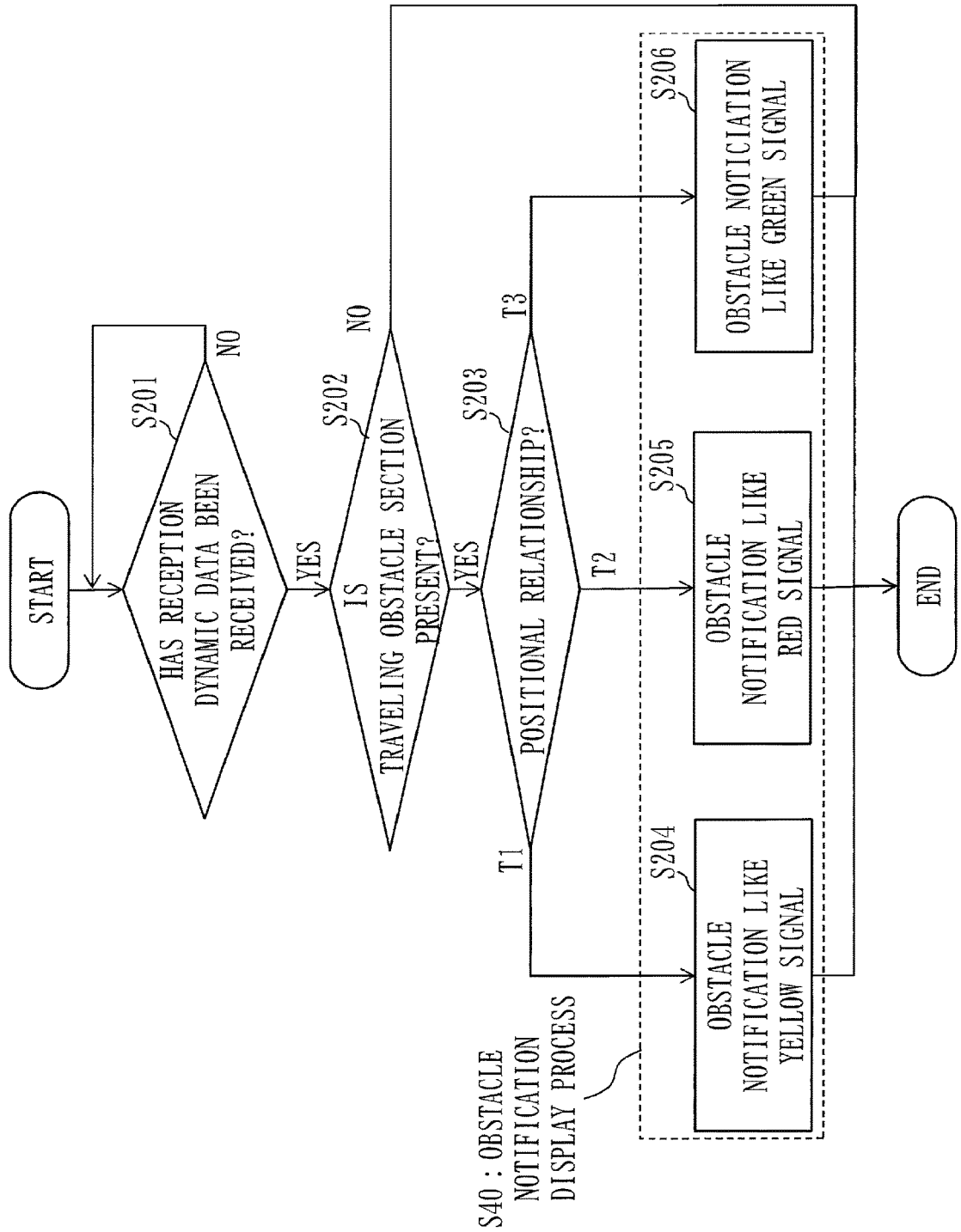
FIG. 11 is a flow diagram illustrating operations of the autonomous driving support apparatus 100a according to the second embodiment.

Operations of the autonomous driving support apparatus 100a according to this embodiment will be described, using FIG. 11.

In step S201, the control unit 110a determines whether or not the reception dynamic data 30a including the traveling support information 31 has been received from the support information delivery apparatus 710. If the reception dynamic data 30a including the traveling support information 31 has been received from the support information delivery apparatus 710, the control unit 110a proceeds to step S202. If the reception dynamic data 30a including the traveling support information 31 has not been received from the support information delivery apparatus 710, the control unit 110a repeats step S201. Specifically, the autonomous vehicle 10a receives the reception dynamic data 30a including the traveling support information 31 at each of the P1 point, the P2 point, the P3 point, and the P4 point.

In step S202, the control unit 110a obtains the reception dynamic data 30a that is received by the receiver 12 via the communication device 950. Further, the control unit 110a detects whether there is the traveling obstacle section AX having a traveling obstacle among the plurality of traveling sections, based on the reception dynamic data 30a and the dynamic map data 30 stored in the dynamic map storage unit 141. If the control unit 110a has detected that there is the traveling obstacle section AX having the traveling obstacle among the plurality of traveling sections, the control unit 110a displays, on the display device 11, an obstacle notification notifying that there is the traveling obstacle section AX via the output interface 940. Specifically, the control unit 110a compares the reception dynamic data 30a received from the support information delivery apparatus 710 with the dynamic map data 30 stored in the dynamic map storage unit 141. If there is, in the reception dynamic data 30a, the traveling support information 31 that is different from the dynamic map data 30, the control unit 110a determines whether or not there is the traveling obstacle section AX on the autonomous driving route 700, based on that traveling support information 31. As illustrated in FIG. 10, the control unit 110a determines that a traveling section between the P2 point and the P3 point, or the traveling section A3 is the traveling obstacle section AX where the traveling obstacle that will cause an obstacle to traveling has occurred.

Subsequently, based on a positional relationship between each traveling section in which the autonomous vehicle 10a travels and the traveling obstacle section AX, the control unit 110a displays the obstacle notification corresponding to the positional relationship.

In step S203, the control unit 110a determines the positional relationship between the autonomous vehicle 10a and the traveling obstacle section AX. If a current position has not reached the traveling obstacle section AX and is in the traveling section not adjacent to the traveling obstacle section AX, the control unit 110a proceeds to step S204. A case where the current position has not reached the traveling obstacle section AX and is in the traveling section not adjacent to the traveling obstacle section AX is set to a positional relationship T1. If the current position is in the traveling obstacle section AX or in the traveling section before and adjacent to the traveling obstacle section AX, the control unit 110a proceeds to step S205. A case where the current position is in the traveling obstacle section AX or in the traveling section before and adjacent to the traveling obstacle section AX is set to a positional relationship T2. If the current position has passed through the traveling obstacle section AX, the control unit 110a proceeds to step S206. A case where the current position has passed through the traveling obstacle section AX is set to a positional relationship T3.

In each of steps S204, S205, and S206, the control unit 110a executes an obstacle notification display process S40 of displaying, on the display device 11, the obstacle notification corresponding to the positional relationship between the autonomous vehicle 10a and the traveling obstacle section AX, based on the positional relationship between the autonomous vehicle 10a and the traveling obstacle section AX.

The positional relationship T1 in step S204 indicates that the autonomous vehicle 10a has not reached the traveling obstacle section AX yet and a distance to the traveling obstacle section AX is comparatively long. Therefore, the control unit 110a displays the obstacle notification like a yellow signal, which prompts caution to the autonomous driving, while continuing the autonomous driving. Specifically, the control unit 110a displays the obstacle notification like the yellow signal such as "An accident has occurred ahead! Exercise caution in the autonomous driving! !".

The positional relationship T2 in step S205 indicates that the autonomous vehicle 10a is in the traveling obstacle section AX or is at a position before and close to the traveling obstacle section AX. Therefore, the control unit 110a stops the autonomous driving or displays the obstacle notification like a red signal, which instructs the stop of the autonomous driving. Specifically, the control unit 110a displays the obstacle notification like the red signal such as "Stop because the accident has occurred! Stop the autonomous driving! !".

The positional relationship T3 in step S206 indicates that the autonomous vehicle 10a has passed through the traveling obstacle section AX. Therefore, the control unit 110a displays the obstacle notification like a green signal, which prompts attention to the autonomous driving. Specifically, the control unit 110a displays the obstacle notification like the green signal such as "The accident has occurred behind! Pay attention to the autonomous driving!".

A specific description will be given, using FIG. 10. It is assumed that in FIG. 10, the traveling section A3 is the traveling obstacle section AX. When the autonomous vehicle 10a is in the traveling section A1, the traveling section A1 is not adjacent to the traveling section A3 and the autonomous vehicle 10a has not reached the traveling section A3. Thus, the control unit 110a displays the obstacle notification like the yellow signal such as "An accident has occurred ahead! Exercise caution in the autonomous driving!!". When the autonomous vehicle 10a is in the traveling section A2, the autonomous vehicle 10a is in the traveling section before and adjacent to the traveling section A3. Thus, the control unit 110a displays the obstacle notification like the red signal such as "Stop because the accident has occurred! Stop the autonomous driving!!". When the autonomous vehicle 10a is in the traveling section A3, the autonomous vehicle 10a is in the traveling obstacle section AX. Thus, the control unit 110a displays the obstacle notification like the red signal such as "Stop because the accident has occurred! Stop the autonomous driving!!". When the autonomous vehicle 10a is in the traveling section A4 or A5, the autonomous vehicle 10a has passed through the traveling section A3. Thus, the control unit 110a displays the obstacle notification like the green signal such as "The accident has occurred behind! Pay attention to the autonomous driving!".

\*\*\*Alternative Configuration\*\*\*

The control unit 110a may perform control of not using, for the autonomous driving, the reception dynamic data 30a on a section not included in the autonomous driving route 700, based on the reception dynamic data 30a and the autonomous driving route 700.

The autonomous vehicle receives the reception dynamic data that is delivered from an infrastructure side. On that occasion, even if the user has received the reception dynamic data on the section other than the autonomous driving route, the user does not or cannot use the reception dynamic data for the autonomous driving. The control unit for the autonomous driving performs an operation of computing whether or not the reception dynamic data that has been received is necessary for the traveling route of the autonomous vehicle, determining that the reception dynamic data received is not used for the autonomous driving as a result, and discarding the received data. On this occasion, a load additional to a load for necessary computing processing is added to the control unit. Thus, a computation delay due to the loads may occur to computation currently necessary for the autonomous driving, thereby adversely affecting an autonomous driving operation. Accordingly, unnecessary computation should not be performed so that the additional load is not added. Specifically, accident information and traffic congestion information on the Hanshin Expressway in Osaka are unnecessary for a vehicle that is traveling on the Yokohama-Yokosuka Road in Kanagawa Prefecture in an inbound direction. Therefore, originally, the control unit for the autonomous driving should perform the operation of discarding the information other than the autonomous traveling route.

\*\*\*Description of Effects of this Embodiment\*\*\*

As mentioned above, in the autonomous driving support system 500a according to this embodiment, the dynamic map data is delivered from the infrastructure, for a section in which the autonomous driving may be performed. The information that is delivered is information for the autonomous vehicle 10a indicating that the autonomous driving may be performed, the autonomous driving must he prohibited, the autonomous driving must be stopped, or the autonomous driving may be performed with attention, and is information that is provided from a side which manages roads. This information is information for preventing, in addition to an accident to be caused by the autonomous vehicle 10a, an indirect accident to be caused by the autonomous vehicle.

In the autonomous driving support system 500a according to this embodiment, the DMD that is stored in the dynamic map storage unit of the autonomous vehicle 10a and the DMD that is delivered from the infrastructure are compared. The dynamic map data that is delivered from the infrastructure is the same data as the dynamic map data that is stored in the dynamic map storage unit in terms of a map. Alternatively, the dynamic map data that is delivered from the infrastructure is also referred to as update data. Therefore, according to the autonomous driving support system 500a in this embodiment, a warning such as the obstacle notification like the red signal, the obstacle notification like the yellow signal, or the obstacle notification like the green signal can be performed, so that application of highly safe autonomous driving can be fostered. As a specific example of the obstacle notification like the red signal, "Please stop the autonomous driving" may also be used, besides the above-mentioned notification. As a specific example of the obstacle notification like the yellow signal, "Please be cautious because the accident is occurring", may be used, besides the above-mentioned notification. As a specific example of the obstacle notification like the green signal, "The autonomous driving may be used on that road" may be used, besides the above-mentioned notification.

In the autonomous driving support system 500a according to this embodiment, the dynamic map data that is delivered from the infrastructure includes the traveling support information for each specific section. The control unit determines whether or not the specific section included in the dynamic map data that is delivered from the infrastructure is included in the autonomous driving route on which the driving is to be performed. Then, if the specific section is included in the autonomous driving route on which the driving is to be performed, the control unit causes the autonomous driving to be performed based on information of the dynamic map data on the specific section. On the other hand, if the specific section is not included in the autonomous driving route on which the driving is to be performed, the control unit does not use, for the autonomous driving, the information of the dynamic map data on the specific section. Therefore, according to the autonomous driving support system 500a in this embodiment, it is determined whether not the information of the dynamic map data is information on the driving route to be traveled. Thus, the autonomous driving using unnecessary information or the information of the dynamic map data on each section that is not on the autonomous driving route can be avoided, so that safe autonomous driving can be implemented.

In the autonomous driving support apparatus 100a according to this embodiment, if the dynamic map data associated with the autonomous driving route indicates that the autonomous driving in the specific section on the autonomous driving route is not possible, the autonomous driving support apparatus 100a does not permit the autonomous driving in that section. Alternatively, the autonomous driving support apparatus 100a notifies, to the user of the autonomous vehicle, that the autonomous driving is not possible. It may be so arranged that if an event that may hinder the autonomous driving has occurred in the specific section, the autonomous driving support apparatus 100a enables the autonomous driving to be performed before and after the section in which an accident has occurred. Further, it may be so arranged the autonomous driving support apparatus 100a causes the user to stop the autonomous driving and perform manual traveling in the section in which the accident has occurred. Such an operation of the autonomous driving support apparatus 100a can implement safe autonomous traveling in which the infrastructure and the vehicle have cooperated.

In the autonomous driving support apparatus 100a according to this embodiment, if there is a section on the autonomous driving route, in which the autonomous driving is not possible, the control unit causes the display device to display that there is the section on a traveling route, in which the autonomous driving is not possible, before traveling in that section is performed. Therefore, according to the autonomous driving support apparatus 100a in this embodiment, an advance warning is provided before the section in which the autonomous driving is not possible is approached. Thus, the user can be prompted to make psychological preparation to perform manual driving, so that the safe autonomous driving can be implemented.

In the embodiment mentioned above, each of the control unit 110, the determination unit 120, and the navigation unit 130 constitutes the autonomous driving support apparatus, as an independent functional block. The configuration of the autonomous driving support apparatus does not need to be the one as illustrated in the embodiment mentioned above, and an arbitrary configuration may be used for the autonomous driving support apparatus. Arbitrary functional blocks of the autonomous driving support apparatus may be used if the functions described in each embodiment mentioned above can be implemented. The autonomous driving support apparatus may be configured with these functional blocks, using any other combination or an arbitrary block configuration.

The autonomous driving support apparatus may be a system that is constituted from a plurality of apparatuses rather than one apparatus.

Though the description has been given about the first to second embodiment, a plurality of portions of these embodiments may be carried out in combination. Alternatively, one portion of these embodiments may be carried out. In addition, these embodiments may be wholly or partially carried out in any combination.

Each embodiment mentioned above is an essentially preferred illustration, and does not intend to limit the present invention and an application and an application range of the present invention. Various modifications are possible as necessary.

REFERENCE SIGNS LIST

10, 10a: autonomous vehicle; 11: display device; 12: receiver; 13: input device; 30: dynamic map data; 30a:

reception dynamic data; 31: traveling support information; 51: contractor information; 52: use condition information; 100, 100a: autonomous driving support apparatus; 110, 110a: control unit; 120: determination unit; 130: navigation unit; 140: storage unit; 141: dynamic map storage unit; 142: use condition storage unit; 143: navigation system; 144: password; 301: contractor; 909: processing circuit; 910: processor; 920: storage device; 921: memory; 922: auxiliary storage device; 930: input interface; 940: output interface; 950: communication device; 400: network; 440: user identification data; 500, 500a: autonomous driving support system; 501: autonomous driving support method; 502: autonomous driving support program; 510: dynamic map data generation apparatus; 521: identification information; 520: autonomous driving dynamic map data provision company; 522: expiration term; 523: version information; 145: threshold period; 530: autonomous driving provision server; 540: infrastructure server; 700: autonomous driving route; 710: support information delivery apparatus; A1, A2, A3, A4, A5: traveling section; AX: traveling obstacle section; S20: determination process; S30: post-determination process; S40: obstacle notification display process; S100: autonomous driving support process; T1, T2, T3: positional relationship

The invention claimed is:

1. An autonomous driving support apparatus mounted on an autonomous vehicle to perform autonomous driving using dynamic map data, the autonomous driving support apparatus comprising:
processing circuitry configured to:
store the dynamic map data,
store use condition information in which a use condition is set, the use condition including identification information for identifying a contractor for whom the autonomous driving by the autonomous vehicle has been permitted and at least one of version information of the dynamic map data and an expiration term of the dynamic map data,
determine whether or not the autonomous driving by the autonomous vehicle is possible, based on the stored dynamic map data and the stored use condition information, and
permit the autonomous driving by the autonomous vehicle based on the dynamic map data when it is determined that the autonomous driving is possible, wherein
the autonomous driving support apparatus is connected to a display device, and
the processing circuitry is configured to:
display, on the display device, an autonomous driving possible notification indicating that the autonomous driving is possible when it is determined that the autonomous driving is possible,
determine that the autonomous driving is possible when a version of the stored dynamic map data and the version information included in the use condition information match each other, and
determine that the autonomous driving is not possible when the version of the stored dynamic map data and the version information included in the use condition information do not match each other.

2. The autonomous driving support apparatus according to claim 1,
wherein the autonomous driving support apparatus is connected to an input device to accept user identification data for identifying a user of the autonomous vehicle, and
wherein, based on the user identification data accepted by the input device and the identification information included in the use condition information, the processing circuitry determines that the autonomous driving is possible when the user is the contractor.

3. The autonomous driving support apparatus according to claim 2,
wherein the input device accepts a password of the user of the autonomous vehicle, and
wherein, based on the password accepted by the input device and the identification information included in the use condition information, the processing circuitry determines that the autonomous driving is possible when the user is the contractor.

4. The autonomous driving support apparatus according to claim 2,
wherein the input device accepts a fingerprint of the user of the autonomous vehicle, and
wherein, based on the fingerprint accepted by the input device and the identification information included in the use condition information, the processing circuitry determines that the autonomous driving is possible when the user is the contractor.

5. The autonomous driving support apparatus according to claim 1,
wherein the processing circuitry implements a navigation system, and
wherein when it is determined that the autonomous driving is not possible, the processing circuitry displays, on the display device, an autonomous driving impossible notification indicating that the autonomous driving is not possible and instructs to implement the navigation system.

6. The autonomous driving support apparatus according to claim 5, wherein when it is determined that the autonomous driving is not possible, the processing circuitry instructs to implement the navigation system including displaying, on the display device, stored navigation map data of the navigation system.

7. The autonomous driving support apparatus according to claim 5, wherein when it is determined that the autonomous driving is not possible, the processing circuitry instructs to implement the navigation system including displaying, on the display device, a confirmation message requesting user input as to whether or not a user needs to use the navigation system.

8. The autonomous driving support apparatus according to claim 1, wherein when a current time is before the expiration term, the processing circuitry determines that the autonomous driving is possible.

9. The autonomous driving support apparatus according to claim 8, wherein when the current time is within a threshold period from the expiration term, the processing circuitry displays, on the display device, an expiration warning notification indicating that the expiration term will expire within the threshold period.

10. The autonomous driving support apparatus according to claim 8, wherein when the expiration term passes during execution of the autonomous driving by the autonomous vehicle, the processing circuitry continues the autonomous driving and displays, on the display device, an expiration notification indicating that the expiration term has passed.

11. The autonomous driving support apparatus according to claim 1,
wherein the autonomous driving support apparatus is connected to a battery of the autonomous vehicle, and
wherein the processing circuitry is constantly activated by power from the battery.

12. The autonomous driving support apparatus according to claim 1, wherein the processing circuitry periodically determines whether or not the autonomous driving by the autonomous vehicle is possible.

13. The autonomous driving support apparatus according to claim 1,
wherein the autonomous vehicle performs the autonomous driving on an autonomous driving route including a plurality of traveling sections,
wherein the autonomous driving support apparatus comprises an output interface connected to the display device of the autonomous vehicle and a communication device connected to a receiver of the autonomous vehicle, and
wherein the processing circuitry obtains, via the communication device, reception dynamic data being dynamic map data that is received by the receiver, and when the processing circuitry detects that there is a traveling obstacle section having a traveling obstacle among the plurality of traveling sections based on the reception dynamic data and the stored dynamic map data, the processing circuitry displays, on the display device, an obstacle notification notifying that there is the traveling obstacle section via the output interface.

14. The autonomous driving support apparatus according to claim 13, wherein, based on a positional relationship between each traveling section in which the autonomous vehicle is traveling and the traveling obstacle section, the processing circuitry displays, on the display device, the obstacle notification corresponding to the positional relationship.

15. The autonomous driving support apparatus according to claim 13, wherein, based on the reception dynamic data and the autonomous driving route, the processing circuitry does not use, for the autonomous driving, the reception dynamic data on a section that is not included in the autonomous driving route.

16. An autonomous driving support method of an autonomous driving support apparatus mounted on an autonomous vehicle to perform autonomous driving using dynamic map data, the method comprising:
storing the dynamic map data;
storing use condition information in which a use condition is set, the use condition including identification information for identifying a contractor for whom the autonomous driving by the autonomous vehicle has been permitted and at least one of version information of the dynamic map data and an expiration term of the dynamic map data;
determining whether or not the autonomous driving by the autonomous vehicle is possible, based on the stored dynamic map data and the stored use condition information, including:
determining that the autonomous driving is possible when a version of the stored dynamic map data and the version information included in the use condition information match each other, and
determining that the autonomous driving is not possible when the version of the stored dynamic map data and the version information included in the use condition information do not match each other;
permitting the autonomous driving by the autonomous vehicle based on the dynamic map data when it is determined that the autonomous driving is possible; and
displaying, on a display device connected to the autonomous driving support apparatus, an autonomous driving possible notification indicating that the autonomous driving is possible when it is determined that the autonomous driving is possible.

* * * * *